United States Patent
Zhong et al.

(10) Patent No.: US 12,213,146 B2
(45) Date of Patent: Jan. 28, 2025

(54) PDCCH MONITORING CONTROL METHOD AND RELATED DEVICE

(71) Applicant: VIVO MOBILE COMMUNICATION CO., LTD., Guangdong (CN)

(72) Inventors: Tingting Zhong, Guangdong (CN); Li Chen, Guangdong (CN); Wei Bao, Guangdong (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 417 days.

(21) Appl. No.: 17/655,693

(22) Filed: Mar. 21, 2022

(65) Prior Publication Data

US 2022/0210773 A1 Jun. 30, 2022

Related U.S. Application Data

(63) Continuation of application No. PCT/CN2020/117065, filed on Sep. 23, 2020.

(30) Foreign Application Priority Data

Sep. 23, 2019 (CN) .......................... 201910899607.0

(51) Int. Cl.
*H04W 72/23* (2023.01)
*H04W 52/02* (2009.01)
*H04W 76/28* (2018.01)

(52) U.S. Cl.
CPC ....... *H04W 72/23* (2023.01); *H04W 52/0235* (2013.01); *H04W 76/28* (2018.02)

(58) Field of Classification Search
CPC .. H04W 72/23; H04W 76/28; H04W 52/0235
See application file for complete search history.

(56) References Cited

U.S. PATENT DOCUMENTS

| 2019/0268905 A1 | 8/2019 | Zhou et al. | |
| 2022/0201516 A1* | 6/2022 | Guo | ....................... H04W 24/08 |
| 2022/0322232 A1* | 10/2022 | Li | ...................... H04W 52/0229 |

FOREIGN PATENT DOCUMENTS

| CN | 109314972 A | 2/2019 |
| CN | 109392140 A | 2/2019 |

(Continued)

OTHER PUBLICATIONS

European Search Report and Opinion for European Application No. 20868352, dated Oct. 20, 2022, 1 page.

(Continued)

*Primary Examiner* — Wayne H Cai
(74) *Attorney, Agent, or Firm* — TraskBritt

(57) ABSTRACT

This disclosure provides a physical downlink control channel (PDCCH) monitoring control method and a related device. The method includes, in the event that an active bandwidth part (BWP) of a terminal has changed from a first BWP to a second BWP, determining whether to perform PDCCH monitoring during a target discontinuous reception onduration (DRX-onduration), where when a BWP switching time point for the terminal is outside an onduration, the target DRX-onduration is an onduration next to the BWP switching time point; and when the BWP switching time point for the terminal is within the onduration, the target DRX-onduration is an onduration within which the BWP switching time point falls.

15 Claims, 6 Drawing Sheets

(56) References Cited

FOREIGN PATENT DOCUMENTS

| CN | 109983822 A | 7/2019 |
|---|---|---|
| CN | 110199550 A | 9/2019 |
| CN | 110267345 A | 9/2019 |
| EP | 3484057 A1 | 5/2019 |

OTHER PUBLICATIONS

Indian First Office Action for Indian Application No. 202217023421, dated Sep. 7, 2022, 6 pages with translation.

Qualcomm Incorporated, "PDCCH-based power saving channel design," 3GPP Draft; R1-1907294 PDCCH-Based Power Saving Channel Design, 3rd Generation Partnership Project (3GPP), Mobile Competence Centre; 650, Route Des Lucioles; F-06921 Sophia-Antipolis Cedex France vol. RAN WGI, no. Reno, USA; May 13, 2019-May 17, 2019 May 13, 2019, pp. 16.

VIVO "PDCCH-based power saving signal/channel design," 3GPP Draft; R1-1908170, 3rd Generation Partnership Project (3GPP), Mobile Competence Centre; 650, Route Des Lucioles; F-06921 Sophia-Antipolis Cedex; France vol. RAN WGI, no. Prague, CZ; Aug. 26, 2019-Aug. 30, 2019 Aug. 17, 2019, Pages.

International Search Report from International Application No. PCT/CN2020/117065, mailed Dec. 30, 2020, 5 pages.

International Written Opinion from International Application No. PCT/CN2020/117065, mailed Dec. 30, 2020, 3 pages.

CATT, "Evaluation Results of UE Power Saving Schemes", 3GPP TSG RAN WG1#96 R1-1902024, Athens, Greece, Feb. 25-Mar. 1, 2019, 17 pages.

Chinese Search Report for Chinese Application No. 201910899607.0, Sep. 23, 2019, 3 pages.

Japanese Notice of Reasons for Refusal for Japanese Application No. 2022-517895, dated Apr. 25, 2023, 6 pages with English translation.

Japanese Notice of Reasons for Refusal for Japanese Application No. 2022-517895, dated Aug. 17, 2023, 6 pages with English translation.

Nokia, Nokia Shanghai Bell, "PDCCH-based Power Saving Signal/Channel", 3GPP TSG RAN WG1#98 R1-1909339, Prague, Czech Republic, Aug. 26-30, 2019, 16 pages.

Samsung, "PDCCH-based Power Saving Signal/Channel", 3GPP TSG RAN WG1#97 R1-1906980, Reno, USA, May 13-17, 2019, 14 pages.

ZTE, "Discussion on Potential Techniques for UE Power Saving", 3GPP TSG RAN WG1#96, R1-1902031, Athens, Greece, Feb. 25-Mar. 1, 2019, 24 pages.

* cited by examiner

In a case that an active bandwidth part BWP of a terminal has changed from a first BWP to a second BWP, determine whether to perform PDCCH monitoring during a target discontinuous reception onduration DRX-onduration ⸺ 201

Send a monitoring indication to a terminal, where the monitoring indication is used for determining, in a case that the terminal performs BWP switching, whether to perform PDCCH monitoring during a target discontinuous reception onduration DRX-onduration —701
FIG. 7
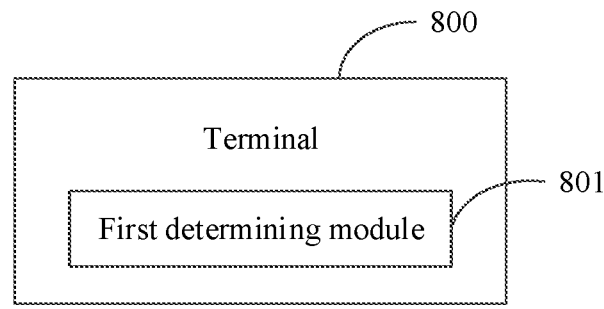
FIG. 8
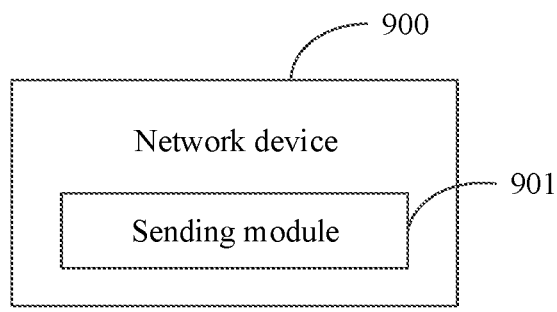
FIG. 9

PDCCH MONITORING CONTROL METHOD AND RELATED DEVICE

CROSS-REFERENCE TO RELATED APPLICATIONS

This application is a continuation of International Application No. PCT/CN2020/117065, filed on Sep. 23, 2020, designating the United States of America and published as International Patent Publication WO 2021/057778 A1 on Apr. 1, 2021, which claims priority to Chinese Patent Application No. 201910899607.0, filed in China on Sep. 23, 2019, the disclosure of each of which is hereby incorporated herein by this reference in its entirety.

TECHNICAL FIELD

This disclosure relates to the field of communications technologies and, in particular, to a PDCCH monitoring control method and a related device.

BACKGROUND

In a related-art mechanism, a terminal can determine, based on whether a wake-up signal (WUS) has been received at a WUS monitoring occasion, whether to monitor a physical downlink control channel (PDCCH), for example, whether to start a next upcoming discontinuous reception onduration timer (DRX-onduration Timer) to determine an onduration status, thereby achieving a power saving effect. However, during active bandwidth part (Active BWP) switching for the terminal, different cases may occur, for example, there may be a BWP without WUS configured among different BWPs, or configured WUS parameters are different. In the related art, it is still unclear whether to perform a PDCCH monitoring behavior during an onduration in an active BWP switching scenario.

BRIEF SUMMARY

Embodiments of this disclosure provide a PDCCH monitoring control method and a related device, so as to resolve the problem of determining whether to perform a PDCCH monitoring behavior during an onduration in an active BWP switching scenario.

According to a first aspect of this disclosure, a PDCCH monitoring control method, applied to a terminal is provided, which includes:
  in a case that an active bandwidth part BWP of the terminal has changed from a first BWP to a second BWP, determining whether to perform PDCCH monitoring during a target discontinuous reception onduration DRX-onduration; where
  when a BWP switching time point for the terminal is outside an onduration, the target DRX-onduration is an onduration next to the BWP switching time point; and
  when the BWP switching time point for the terminal is within the onduration, the target DRX-onduration is an onduration within which the BWP switching time point falls.

According to a second aspect of this disclosure, a PDCCH monitoring control method, applied to a network device is provided, which includes:
  sending a monitoring indication to a terminal, where the monitoring indication is used for determining, in a case that the terminal performs BWP switching, whether to perform PDCCH monitoring during a target discontinuous reception onduration DRX-onduration; where
  when a BWP switching time point for the terminal is outside an onduration, the target DRX-onduration is an onduration next to the BWP switching time point; and
  when the BWP switching time point for the terminal is within the onduration, the target DRX-onduration is an onduration within which the BWP switching time point falls.

According to a third aspect of this disclosure a terminal is provided, which includes:
  a first determiner, configured to: in a case that an active bandwidth part BWP of the terminal has changed from a first BWP to a second BWP, determine whether to perform PDCCH monitoring during a target discontinuous reception onduration DRX-onduration; where
  when a BWP switching time point for the terminal is outside an onduration, the target DRX-onduration is an onduration next to the BWP switching time point; and
  when the BWP switching time point for the terminal is within the onduration, the target DRX-onduration is an onduration within which the BWP switching time point falls.

According to a fourth aspect of this disclosure, a network device is provided, which includes:
  a sender, configured to send a monitoring indication to a terminal, where the monitoring indication is used for determining, in a case that the terminal performs BWP switching, whether to perform PDCCH monitoring during a target discontinuous reception onduration DRX-onduration; where
  when a BWP switching time point for the terminal is outside an onduration, the target DRX-onduration is an onduration next to the BWP switching time point; and
  when the BWP switching time point for the terminal is within the onduration, the target DRX-onduration is an onduration within which the BWP switching time point falls.

According to a fifth aspect of this disclosure, a terminal is provided, which includes a memory, a processor, and a program stored in the memory and capable of running on the processor, where when the program is executed by the processor, the steps of the foregoing PDCCH monitoring control method are implemented.

According to a sixth aspect of this disclosure, a network device is provided, which includes a memory, a processor, and a program stored in the memory and capable of running on the processor, where when the program is executed by the processor, the steps of the foregoing PDCCH monitoring control method are implemented.

According to a seventh aspect of this disclosure, a computer-readable storage medium is provided. A computer program is stored in the computer-readable storage medium, and when the computer program is executed by the processor, the steps of the foregoing PDCCH monitoring control method are implemented.

According to the embodiments of this disclosure, in a case that the active bandwidth part BWP of the terminal has changed from the first BWP to the second BWP, the status of the target onduration associated with the BWP switching time point for the terminal is determined, so as to determine a PDCCH monitoring behavior during the target onduration, thereby ensuring system reliability.

BRIEF DESCRIPTION OF THE DRAWINGS

To describe the technical solutions in the embodiments of this disclosure more clearly, the following briefly introduces the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

FIG. 7 is a flowchart of another PDCCH monitoring control method according to an embodiment of this disclosure;

FIG. 8 is a structural diagram of a terminal according to an embodiment of this disclosure;

FIG. 9 is a structural diagram of a network device according to an embodiment of this disclosure;

DETAILED DESCRIPTION

The following clearly and completely describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, the use of "and/or" represents presence of at least one of the connected objects, for example, "A and/or B" indicates the following three cases: A alone, B alone, or both A and B.

In the embodiments of this disclosure, terms such as "an example" or "for example" are used to represent examples, illustrations, or explanations. Any embodiment or design solution described as "an example" or "for example" in the embodiments of this disclosure should not be construed as preferred or advantageous over other embodiments or design solutions. To be precise, the words such as "an example" or "for example" are intended to present a related concept in a specific manner.

The following describes the embodiments of this disclosure with reference to the accompanying drawings. A PDCCH monitoring control method and a related device provided in the embodiments of this disclosure may be applied to a wireless communications system. The wireless communications system may be a 5G system, an evolved long term evolution (eLTE) system, or a later evolved communications system.

Figures 1, 2:
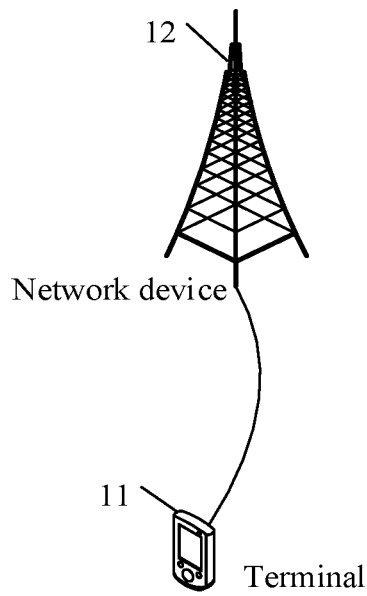
FIG. 1 is a structural diagram of a network system to which the embodiments of this disclosure are applicable.
FIG. 2 is a flowchart of a PDCCH monitoring control method according to an embodiment of this disclosure.

FIG. 1 is a structural diagram of a network system to which the embodiments of this disclosure are applicable. As shown in FIG. 1, the network system includes a terminal 11 and a network device 12. The terminal 11 may be a user terminal or another terminal-side device, for example, a mobile phone, a tablet personal computer (Tablet Personal Computer), a laptop computer (Laptop Computer), a personal digital assistant (PDA), a mobile Internet device (MID), or a wearable device (Wearable Device). It should be noted that a specific type of the terminal 11 is not limited in this embodiment of this disclosure. The network device 12 may be a 5G base station, or a base station of a later version, or a base station in another communications system, or is referred to as a NodeB, or an evolved NodeB, or a transmission and reception point (TRP), or an access point (AP), or other terms in the art. As long as a same technical effect is achieved, the network device is not limited to a specific technical term. In addition, the network device 12 may be a master node (MN) or a secondary node (SN). It should be noted that the 5G base station is used merely as an example in this embodiment of this disclosure, rather than limiting a specific type of the network device.

FIG. 2 is a flowchart of a physical downlink control channel PDCCH monitoring control method according to an embodiment of this disclosure. The method is applied to a terminal. As shown in FIG. 2, the method includes the following steps.

Step 201: In a case that an active bandwidth part BWP of the terminal has changed from a first BWP to a second BWP, determine whether to perform PDCCH monitoring during a target discontinuous reception onduration (Discontinuous Reception onduration, DRX-onduration).

When a BWP switching time point for the terminal is outside an onduration, the target DRX-onduration is an onduration next to the BWP switching time point; and when the BWP switching time point for the terminal is within the onduration, the target DRX-onduration is an onduration within which the BWP switching time point falls.

Figure 3:
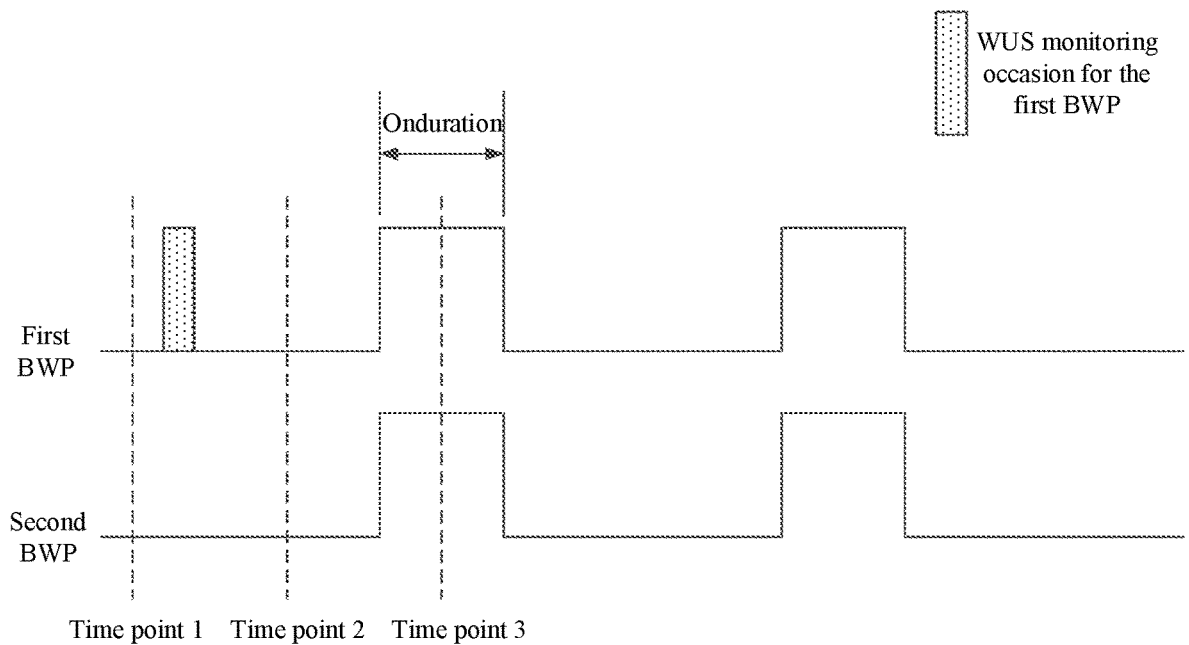
FIG. 3 is a first example diagram of a position of a BWP switching time point for a PDCCH monitoring control method according to an embodiment of this disclosure.

In this embodiment of this disclosure, the target DRX-onduration is an onduration associated with the switching time point. The BWP switching time point for the terminal being outside the onduration can be construed as the BWP switching time point for the terminal being prior to a starting time point of the target DRX-onduration. The BWP switching time point for the terminal being within an onduration of a discontinuous reception DRX cycle can be construed as the BWP switching time point for the terminal being between the starting time point and an ending time point of the target DRX-onduration. As shown in FIG. 3, the BWP switching time point being a time point 1 or time point 2 means that the BWP switching time point is outside the onduration; and the BWP switching time point being a time point 3 means that the BWP switching time point is within the onduration.

When the BWP switching time point for the terminal is outside the onduration of the discontinuous reception DRX cycle, the determining whether to perform PDCCH monitoring during the target DRX-onduration can be understood as: determining whether to start a next upcoming DRX-onduration timer. When the terminal determines to start the DRX-onduration timer, PDCCH monitoring is performed in the next DRX-onduration; and when the terminal determines not to start the DRX-onduration timer, PDCCH monitoring is not performed in the next DRX-onduration.

Specifically, a status of the target DRX-onduration can be set according to actual needs. In this embodiment of this disclosure, behavior of the terminal for controlling the status of the target DRX-onduration mainly includes the following several cases:

Case 1: based on a power saving signal of the first BWP;
Case 2: based on a power saving signal of the second BWP;
Case 3: based on a latest power saving signal;
Case 4: based on protocol specification that PDCCH monitoring be performed in the target DRX-onduration;
Case 5: based on protocol specification that PDCCH monitoring not be performed in the target DRX-onduration; and
Case 6: according to an indication of the network device.

It should be understood that the power saving signal may include a wake-up signal (wake up signal, WUS) and a sleep signal. The WUS includes a PDCCH-based power saving signal (PDCCH-based power saving signal/channel scheme for wake-up purpose, PDCCH-WUS) and any other signals designed for wake-up purpose. The following embodiments provide descriptions using the PDCCH-WUS as an example. In other words, a WUS described in the following embodiments can be understood as a PDCCH-WUS. Being based on a power saving signal of the first BWP can be construed as being based on a WUS of the first BWP; and being based on a power saving signal of the second BWP can be construed as being based on a WUS of the second BWP.

The target DRX-onduration is a period of time with fixed positions, including the starting time point and the ending time point. Each DRX starts with DRX-onduration. One WUS monitoring occasion (WUS occasion) is configured for each DRX, and each WUS is used for indicating a next DRX-onduration of a corresponding WUS occasion.

According to this embodiment of this disclosure, in a case that the active bandwidth part BWP of the terminal has changed from the first BWP to the second BWP, the status of the target onduration associated with the BWP switching time point for the terminal is determined, so as to determine a PDCCH monitoring behavior during the target onduration, thereby ensuring system reliability.

It should be understood that in this embodiment of this disclosure, the status of the target DRX-onduration can be determined based on at least one of a position of the BWP switching time point, whether the first wake-up signal is configured for the first BWP, and whether the second wake-up signal is configured for the second BWP. For the foregoing cases 1 to 6, based on whether a WUS is configured for the first BWP and the second BWP, and based on the position of the BWP switching time point, a corresponding status of the target DRX-onduration is different. The following provides descriptions in detail by using different embodiments.

In an embodiment, if the first wake-up signal is configured for the first BWP, the determining whether to perform PDCCH monitoring in the target DRX-onduration includes at least one of the following:
if the BWP switching time point is before a reception occasion of the first wake-up signal, determining, based on a protocol-prescribed monitoring status, whether to perform PDCCH monitoring during the target DRX-onduration; or
if the BWP switching time point is after the reception occasion of the first wake-up signal, determining, based on a reception status of the first wake-up signal, whether to perform PDCCH monitoring during the target DRX-onduration.

In this embodiment, regardless of whether the second wake-up signal is configured for the second BWP, the status of the target onduration is determined based on the first wake-up signal of the first BWP. Specifically, if the BWP switching time point is before the reception occasion of the first wake-up signal, the terminal misses monitoring of the first wake-up signal, and the terminal starts the next DRX-onduration timer or does not start the next DRX-onduration timer by default. When the next DRX-onduration timer (which is an onduration timer corresponding to the target onduration) is started, the next DRX-onduration enters a wake-up state, and the terminal may monitor the PDCCH in the next DRX-onduration. When the next DRX-onduration timer is not started, the next DRX-onduration remains a dormant state, and the terminal does not need to monitor the PDCCH in the next DRX-onduration.

If the BWP switching time point is after the reception occasion of the first wake-up signal, it is equivalent that monitoring of the first wake-up signal is not missed. In this case, whether to perform PDCCH monitoring during the target DRX-onduration can be determined based on the reception status of the first wake-up signal. Specifically, in the case that the BWP switching time point is before the starting time point of the target DRX-onduration, if a WUS is received on the first BWP, the next DRX-onduration timer is started; or if a WUS is not received on the first BWP, the next DRX-onduration timer is not started. No WUS being received on the first BWP may be that a received power-saving signal is a sleep signal, or no power-saving signal is sent by the network device and only a monitoring occasion for the power-saving signal is configured.

In another embodiment, in a case that a first wake-up signal is configured for the first BWP and a second wake-up signal is not configured for the second BWP, the determining whether to perform PDCCH monitoring during a target DRX-onduration includes at least one of the following:
if the BWP switching time point is outside the target DRX-onduration, determining, based on a protocol-prescribed monitoring status, whether to perform PDCCH monitoring during the target DRX-onduration; or
if the BWP switching time point is within the target DRX-onduration, determining, based on a reception status of the first wake-up signal, whether to perform PDCCH monitoring in a first portion of time, and determining, based on a protocol-prescribed monitoring status, whether to perform PDCCH monitoring in a second portion of time; where
the first portion of time is a period of time prior to the BWP switching time point in the target DRX-onduration, and the second portion of time is a period of time after the BWP switching time point in the target DRX-onduration.

In this embodiment, the status of the target DRX-onduration is determined based on the second wake-up signal of the second BWP. If the BWP switching time point is outside the target DRX-onduration, because the second wake-up signal is not configured for the second BWP and no second wake-up signal can be received on the second BWP, the next DRX-onduration timer is started by default, or the next DRX-onduration timer is not started by default. If the BWP switching time point is within the target DRX-onduration, a starting status of the target DRX-onduration timer can be first controlled based on the reception status of the first wake-up signal of the first BWP. In a case that the first wake-up signal is received on the first BWP, the next DRX-onduration timer is started; and in a case that no first wake-up signal is received on the first BWP, the next DRX-onduration timer is not started. In a second portion of time of the target DRX-onduration, because the second wake-up signal is not configured for the second BWP, PDCCH monitoring may be not performed by default, or PDCCH monitoring is performed by default.

In another embodiment, in a case that a first wake-up signal is not configured for the first BWP and a second wake-up signal is configured for the second BWP, the determining whether to perform PDCCH monitoring during a target DRX-onduration includes:

determining, based on a protocol-prescribed monitoring status, whether to perform PDCCH monitoring during the target DRX-onduration.

In this embodiment, the status of the target onduration is determined based on the first wake-up signal of the first BWP. Specifically, the first wake-up signal is not configured for the first BWP; therefore, whenever BWP switching is performed, the next DRX-onduration timer can be started by default, or the next DRX-onduration timer is not started by default.

In another embodiment, in a case that a first wake-up signal is not configured for the first BWP and a second wake-up signal is configured for the second BWP, the determining whether to perform PDCCH monitoring during a target DRX-onduration includes at least one of the following:

if the BWP switching time point is before a reception occasion of the second wake-up signal, determining, based on a reception status of the second wake-up signal, whether to perform PDCCH monitoring during the target DRX-onduration; or if the BWP switching time is after the reception occasion of the second wake-up signal, determining, based on a protocol-prescribed monitoring status, whether to perform PDCCH monitoring during the target DRX-onduration.

In this embodiment of this disclosure, the status of the target DRX-onduration is determined based on the second wake-up signal of the second BWP. If the BWP switching time point is before the reception occasion of the second wake-up signal, because monitoring of the second wake-up signal is not missed, the next DRX-onduration timer is started in the case that the second wake-up signal is received on the second BWP, and the next DRX-onduration timer is not started in the case that no second wake-up signal is received on the second BWP. If the BWP switching time point is after the reception occasion of the second wake-up signal, because monitoring of the second wake-up signal is missed, PDCCH monitoring may be performed or not performed during the target DRX-onduration by default in this case. For example, when the BWP switching time point is outside the target DRX-onduration, the next DRX-onduration timer is started by default, or the next DRX-onduration timer is not started by default.

In another embodiment, in a case that a first wake-up signal is configured for the first BWP and a second wake-up signal is configured for the second BWP, the determining whether to perform PDCCH monitoring during a target DRX-onduration includes at least one of the following:

if the BWP switching time point is before a reception occasion of the second wake-up signal, determining, based on a reception status of the second wake-up signal, whether to perform PDCCH monitoring during the target DRX-onduration;

if the BWP switching time point is between the reception occasion of the second wake-up signal and a starting time point of the target DRX-onduration, determining, based on a protocol-prescribed monitoring status, whether to perform PDCCH monitoring during the target DRX-onduration; or if the BWP switching time point is within the target DRX-onduration, determining, based on a reception status of the first wake-up signal, whether to perform PDCCH monitoring in a first portion of time, and determining, based on a protocol-prescribed monitoring status, whether to perform PDCCH monitoring in a second portion of time; where the first portion of time is a period of time prior to the BWP switching time point in the target DRX-onduration, and the second portion of time is a period of time after the BWP switching time point in the target DRX-onduration.

In this embodiment of this disclosure, the status of the target DRX-onduration is determined based on the second wake-up signal of the second BWP. If the BWP switching time point is before the reception occasion of the second wake-up signal, because monitoring of the second wake-up signal is not missed, the next DRX-onduration timer is started in the case that the second wake-up signal is received on the second BWP, and the next DRX-onduration timer is not started in the case that no second wake-up signal is received on the second BWP. If the BWP switching time point is between the reception occasion of the second wake-up signal and a starting time point of the target DRX-onduration, because monitoring of the second wake-up signal is missed, in this case, the next DRX-onduration timer may be started by default, or the next DRX-onduration timer may be not started by default.

In another embodiment, in a case that a first wake-up signal is configured for the first BWP and a second wake-up signal is configured for the second BWP, the determining whether to perform PDCCH monitoring during a target DRX-onduration includes:

if the BWP switching time point is after a reception occasion of the first wake-up signal and a reception occasion of the second wake-up signal, and before a starting time point of the target DRX-onduration, determining, based on a reception status of a target wake-up signal, whether to perform PDCCH monitoring during the target DRX-onduration; where the target wake-up signal is a wake-up signal whose reception occasion is closer to the target DRX-onduration in the first wake-up signal and the second wake-up signal.

The first wake-up signal and the second wake-up signal each have a corresponding reception occasion, namely, WUS occasion. In this embodiment, a WUS associated with a most recent or latest WUS occasion is used. In other words, the target wake-up signal can be construed as a WUS associated with the latest or latest WUS occasion. Specifically, if the target wake-up signal is received on the latest or latest WUS occasion, the next DRX-onduration timer is started; or if no target wake-up signal is received on the latest or latest WUS occasion, the next DRX-onduration timer is not started. The status of the target DRX-onduration is determined based on the reception status of the WUS associated with the latest WUS occasion, so as to ensure accuracy of controlling the status of the target DRX-onduration.

In another embodiment, in a case that the BWP switching time point is within the target DRX-onduration, the determining whether to perform PDCCH monitoring during a target DRX-onduration includes at least one of the following:

in a case that a first wake-up signal is configured for the first BWP, determining, based on a reception status of the first wake-up signal, whether to perform PDCCH monitoring in a first portion of time, and determining, according to a target monitoring indication sent by a network device, whether to perform PDCCH monitoring in a second portion of time; or in a case that the first wake-up signal is not configured for the first BWP, determining, based on a protocol-prescribed monitoring status, whether to perform PDCCH monitoring in the first portion of time, and determining, according to a monitoring indication sent by the network device, whether to perform PDCCH monitoring in the second portion of time; where the first portion of time is a period of time prior to the BWP switching time point in the target DRX-onduration, and the second portion of time is a period of time after the BWP switching time point in the target DRX-onduration.

In this embodiment, the status of the target DRX-onduration may be determined according to an indication of the network device. Specifically, the monitoring indication is an indication sent by the network device based on monitoring suggestion information that is reported by the terminal. Optionally, the terminal may report its preference (preference) to the network after considering importance of power saving performance and quality of service (Quality of Service, QoS) of the terminal, and the network device may send the monitoring indication by using RRC signaling, to inform the terminal whether to start the DRX-onduration timer. Indication information of the monitoring indication being used to indicate starting the DRX-onduration timer may be construed as performing PDCCH monitoring in the corresponding DRX-onduration. The indication information of the monitoring indication being used to indicate not starting the DRX-onduration timer may be construed as not performing PDCCH monitoring in the corresponding DRX-onduration. In this embodiment of this disclosure, the terminal provides suggestion information based on its own actual situation, and then the network device determines to send the monitoring indication, thereby improving flexibility of monitoring and also meeting actual requirements of the terminal and the network device. For example, the terminal may suggest no monitoring in a case of low power level. When the network device determines to send data and/or control information in the next DRX-onduration, the network device may indicate the terminal to perform monitoring in the next DRX-onduration.

In another embodiment, in a case that the BWP switching time point is outside the target DRX-onduration, the determining whether to perform PDCCH monitoring during a target DRX-onduration includes:

determining, according to a monitoring indication sent by a network device, whether to perform PDCCH monitoring during the target DRX-onduration.

In this embodiment, the status of the target DRX-onduration may be determined according to an indication of the network device. If the indication information of the monitoring indication indicates starting the DRX-onduration timer, the terminal starts the next DRX-onduration timer; or if the indication information of the monitoring indication indicates not starting the DRX-onduration timer, the terminal does not start the next DRX-onduration timer.

In another embodiment, in a case that the BWP switching time point is within the target DRX-onduration, the determining whether to perform PDCCH monitoring during a target DRX-onduration includes at least one of the following:

in a case that a first wake-up signal is configured for the first BWP, determining, based on a reception status of the first wake-up signal, whether to perform PDCCH monitoring in a first portion of time, and determining, based on a protocol-prescribed monitoring status, whether to perform PDCCH monitoring in a second portion of time; or in a case that the first wake-up signal is not configured for the first BWP, determining, based on a protocol-prescribed monitoring status, whether to perform PDCCH monitoring during the target DRX-onduration; where the first portion of time is a period of time prior to the BWP switching time point in the target DRX-onduration, and the second portion of time is a period of time after the BWP switching time point in the target DRX-onduration.

In this embodiment, the status of the target DRX-onduration is determined according to a protocol prescription. Specifically, in the case of being within the target DRX-onduration, because the second wake-up signal of the second BWP cannot be received, PDCCH monitoring may be performed or not performed by default in the second portion of time of the target DRX-onduration. In the case that the first wake-up signal is configured for the first BWP, if the first wake-up signal is received, PDCCH monitoring may be performed in the first portion of time of the target DRX-onduration; or if no first wake-up signal is received, PDCCH monitoring may be not performed in the first portion of time of the target DRX-onduration. In the case that the first wake-up signal is not configured for the first BWP, PDCCH monitoring may be performed or not performed by default in the target DRX-onduration.

In another embodiment, in a case that the BWP switching time point is outside the target DRX-onduration, the determining whether to perform PDCCH monitoring during a target DRX-onduration includes:

determining, based on a protocol-prescribed monitoring status, whether to perform PDCCH monitoring during the target DRX-onduration.

In this embodiment, the status of the target DRX-onduration is determined according to a protocol prescription. Specifically, regardless of whether the first wake-up signal is configured for the first BWP and the second wake-up signal is configured for the second BWP, the next DRX-onduration may be started by default, or the next DRX-onduration may not be started by default.

In order to better understand this disclosure, the following describes in detail the status of the target DRX-onduration in different scenarios in which a PDCCH-WUS is configured or not configured for the first BWP (a source BWP for BWP switching) and a PDCCH-WUS is configured or not configured for the second BWP (a target BWP for BWP switching).

Scheme 1: In a case that the terminal switches from the first BWP with PDCCH-WUS configured to the second BWP without PDCCH-WUS configured, a behavior of the terminal on the DRX-onduration timer is analyzed with reference to FIG. 3 in the following three cases:
1. the PDCCH-WUS of the first BWP indicates starting the onduration timer (that is, the terminal is woken up);
2. the PDCCH-WUS of the first BWP indicates not starting the onduration timer (that is, the terminal is dormant); and
3. monitoring on the PDCCH-WUS of the first BWP is missed.

As shown in FIG. 3, a time point 1, a time point 2, and a time point 3 represent three BWP switching time points. The time point 1 indicates a case that monitoring on the PDCCH-WUS of the first BWP is missed. The time point 2 indicates a case that monitoring on the PDCCH-WUS of the first BWP is not missed and the PDCCH-WUS signal is received or not received. The time point 3 indicates a case that the switching time point is within the DRX-onduration.

For the foregoing cases, the following sub-schemes are included in the scheme 1.

Scheme 1A: Compliance with an indication of the PDCCH-WUS of the first BWP. In this scheme, the PDCCH-WUS of the first BWP is a key basis for determining, regardless of whether the PDCCH-WUS is configured for the second BWP.

In the case of the time point 2, if the PDCCH-WUS is received on the first BWP, the next DRX-onduration timer is started; and if no PDCCH-WUS is received on the first BWP, the next DRX-onduration timer is not started.

In the case of the time point 1, monitoring at the WUS occasion of the first BWP is missed, the terminal may start the next DRX-onduration timer, or may not start the next DRX-onduration timer.

In the case of the time point 3, the switching time point is within the DRX-onduration, the terminal always follows the indication of the WUS of the first BWP.

Scheme 1B: Compliance with an indication of the PDCCH-WUS of the second BWP. In this scheme, the PDCCH-WUS of the second BWP is a key basis for determining, regardless of whether the PDCCH-WUS is configured for the first BWP.

In the case of the time point 3, the terminal follows an indication of the WUS of the first BWP in a period of time between the starting time point of the onduration and the switching time point; and the terminal follows an indication of a WUS for a target BWP in a period of time between the switching time point and an ending time point of the onduration. However, because no WUS is configured for the second BWP, the PDCCH channel may be monitored or may not be monitored.

In all cases of other time points, the terminal may start the next DRX-onduration timer or may not start the next DRX-onduration timer.

Scheme 1C: The DRX-onduration timer is always started. In this scheme, the DRX-onduration timer is always started once BWP switching is performed, that is, the UE is always woken up to monitor the PDCCH channel. This is unrelated to WUS configuration statuses of the first BWP and the second BWP.

In the case of the time point 3, the UE follows an indication of the WUS of the first BWP in a period of time between the starting time point of the onduration and the switching time point; and the terminal keeps monitoring the PDCCH channel in a period of time between the switching time point and an ending time point of the onduration.

In all cases of other time points, the terminal always starts the DRX-onduration timer, that is, the UE is always woken up to monitor the PDCCH channel.

Scheme 1D: The DRX-onduration timer is never started. In this scheme, the DRX-onduration timer is never started once BWP switching is performed, that is, the UE remains dormant not to monitor the PDCCH channel. This is unrelated to WUS configuration statuses of the first BWP and the second BWP.

In the case of the time point 3, the UE follows an indication of the WUS of the first BWP in a period of time between the starting time point of the onduration and the switching time point; and the terminal never monitors the PDCCH channel in a period of time between the switching time point and an ending time point of the onduration.

In all cases of other time points, the terminal never starts the DRX-onduration timer, that is, the UE remains dormant not to monitor the PDCCH channel.

Scheme 1E: To be decided by the network device. In this scheme, the terminal reports its preference to the network device after considering importance of power saving performance and QoS quality of the terminal, and the network device sends RRC signaling to inform the terminal whether to start the onduration timer.

In the case of the time point 3, the terminal follows an indication of the WUS of the first BWP in a period of time between the starting time point of the onduration and the switching time point. In a period of time between the switching time point and an ending time point of the onduration, the terminal reports its preference to the network device after considering importance of power saving performance and QoS quality of the terminal, and the network device sends RRC signaling to inform the terminal whether to monitor the PDCCH channel.

In all cases of other time points, the terminal follows an indication of the WUS of the first BWP. In a period of time between the switching time point and an ending time point of the onduration, the terminal reports its preference to the network device after considering importance of power saving performance and QoS quality of the terminal, and the network device sends RRC signaling to inform the terminal whether to start the onduration timer.

Scheme 2: In a case that the terminal switches from the first BWP without PDCCH-WUS configured to the second BWP with PDCCH-WUS configured, a behavior of the terminal on the DRX-onduration timer is analyzed with reference to FIG. 4 in the following three cases:
1. the PDCCH-WUS of the second BWP indicates starting the onduration timer (that is, the terminal is woken up);
2. the PDCCH-WUS of the second BWP indicates not starting the onduration timer (that is, the terminal is dormant); and
3. monitoring on the PDCCH-WUS of the second BWP is missed.

Figure 4:
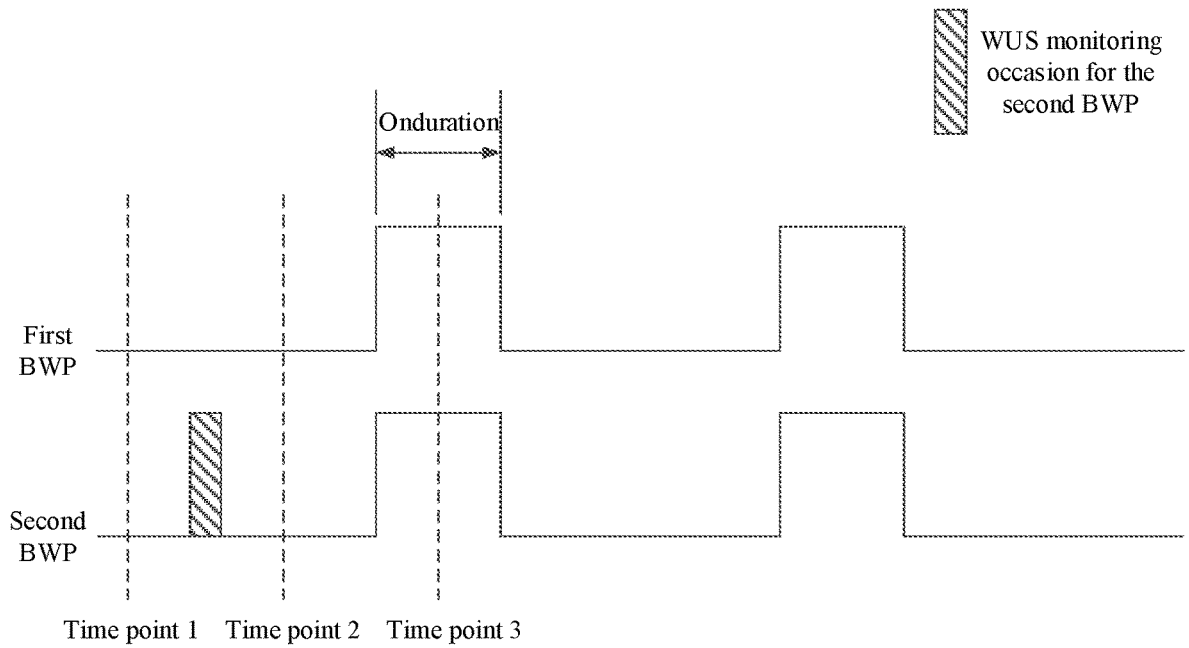
FIG. 4 is a second example diagram of a position of a BWP switching time point for a PDCCH monitoring control method according to an embodiment of this disclosure.

As shown in FIG. 4, a time point 1, a time point 2, and a time point 3 represent three BWP switching time points. The time point 1 indicates a case that monitoring on the PDCCH-WUS of the second BWP is not missed or no PDCCH-WUS is received. The time point 2 indicates a case that monitoring on the PDCCH-WUS of the second BWP is missed. The time point 3 indicates a case that the switching time point is within the DRX-onduration.

For the foregoing cases, the following sub-schemes are included in the scheme 2.

Scheme 2A: Compliance with an indication of the PDCCH-WUS of the first BWP.

In this embodiment, no WUS is configured for the first BWP, and therefore there is no difference between the cases of the time point 1, the time point 2, and the time point 3.

In this case, the terminal may start the next DRX-onduration timer or may not start the next DRX-onduration timer.

Scheme 2B: Compliance with an indication of the PDCCH-WUS of the second BWP.

In the case of the time point 1, if the PDCCH-WUS is received on the second BWP, the next DRX-onduration timer is started; and if no PDCCH-WUS is received on the second BWP, the next DRX-onduration timer is not started.

In the case of the time point 2, monitoring at the WUS occasion of the second BWP is missed, the terminal may start the next DRX-onduration timer, or may not start the next DRX-onduration timer.

In the case of the time point 3, the switching time point is within the DRX-onduration. In this case, the terminal follows an indication of the WUS of the first BWP in a period of time between the starting time point of the onduration and the switching time point; however, no WUS is configured for the first BWP, and therefore PDCCH monitoring may be performed or may not be performed. In a period of time between the switching time point and an ending time point of the onduration, the terminal follows an indication of the PDCCH-WUS of the second BWP; however, monitoring at the WUS occasion of the second BWP is missed, and therefore PDCCH monitoring may be performed or may not be performed.

Scheme 2C: The DRX-onduration timer is always started.

In the case of the time point 3, the UE follows an indication of the WUS of the first BWP in a period of time between the starting time point of the onduration and the switching time point; however, no WUS is configured for the first BWP, and therefore the PDCCH channel may be monitored or may not be monitored. In a period of time between the switching time point and an ending time point of the onduration, the UE keeps monitoring the PDCCH channel.

In all cases of other time points, the terminal always starts the DRX-onduration timer, that is, the UE is always woken up to monitor the PDCCH channel.

Scheme 2D: The DRX-onduration timer is never started.

In the case of the time point 3, the UE follows an indication of the WUS of the first BWP in a period of time between the starting time point of the onduration and the switching time point; however, no WUS is configured for the first BWP, and therefore the PDCCH channel may be monitored or may not be monitored. In a period of time between the switching time point and an ending time point of the onduration, the UE never monitors the PDCCH channel.

In all cases of other time points, the terminal never starts the DRX-onduration timer, that is, the UE remains dormant not to monitor the PDCCH channel.

Scheme 2E: To be decided by the network device.

In the case of the time point 3, the terminal follows an indication of the WUS of the first BWP in a period of time between the starting time point of the onduration and the switching time point; however, no WUS is configured for the first BWP, and therefore the PDCCH channel may be monitored or may not be monitored. In a period of time between the switching time point and an ending time point of the onduration, the terminal reports its preference to the network device after considering importance of power saving performance and QoS quality of the terminal, and the network device sends RRC signaling to inform the terminal whether to monitor the PDCCH channel.

In all cases of other time points, the terminal follows an indication of the WUS of the first BWP. In a period of time between the switching time point and an ending time point of the onduration, the terminal reports its preference to the network device after considering importance of power saving performance and QoS quality of the terminal, and the network device sends RRC signaling to inform the terminal whether to start the onduration timer.

Scheme 3: In a case that the terminal switches from the first BWP with PDCCH-WUS configured to the second BWP with PDCCH-WUS configured, a behavior of the terminal on the DRX-onduration timer is analyzed with reference to FIG. 5 and FIG. 6 in the following seven cases:

1. the PDCCH-WUS of the first BWP indicates starting the onduration timer (that is, the terminal is woken up), and the PDCCH-WUS of the second BWP indicates starting the onduration timer (that is, the terminal is woken up);
2. the PDCCH-WUS of the first BWP indicates not starting the onduration timer (that is, the terminal is dormant), and the PDCCH-WUS of the second BWP indicates not starting the onduration timer (that is, the terminal is dormant);
3. the PDCCH-WUS of the first BWP indicates starting the onduration timer (that is, the terminal is woken up), and the PDCCH-WUS of the second BWP indicates not starting the onduration timer (that is, the terminal is dormant);
4. the PDCCH-WUS of the first BWP indicates not starting the onduration timer (that is, the terminal is dormant), and the PDCCH-WUS of the second BWP indicates starting the onduration timer (that is, the terminal is woken up);
5. monitoring on the PDCCH-WUS of the first BWP is missed, and monitoring on the PDCCH-WUS of the second BWP is missed;
6. monitoring on the PDCCH-WUS of the first BWP is not missed, and monitoring on the PDCCH-WUS of the second BWP is missed; and
7. monitoring on the PDCCH-WUS of the first BWP is missed, and monitoring on the PDCCH-WUS of the second BWP is not missed.

Figure 5:
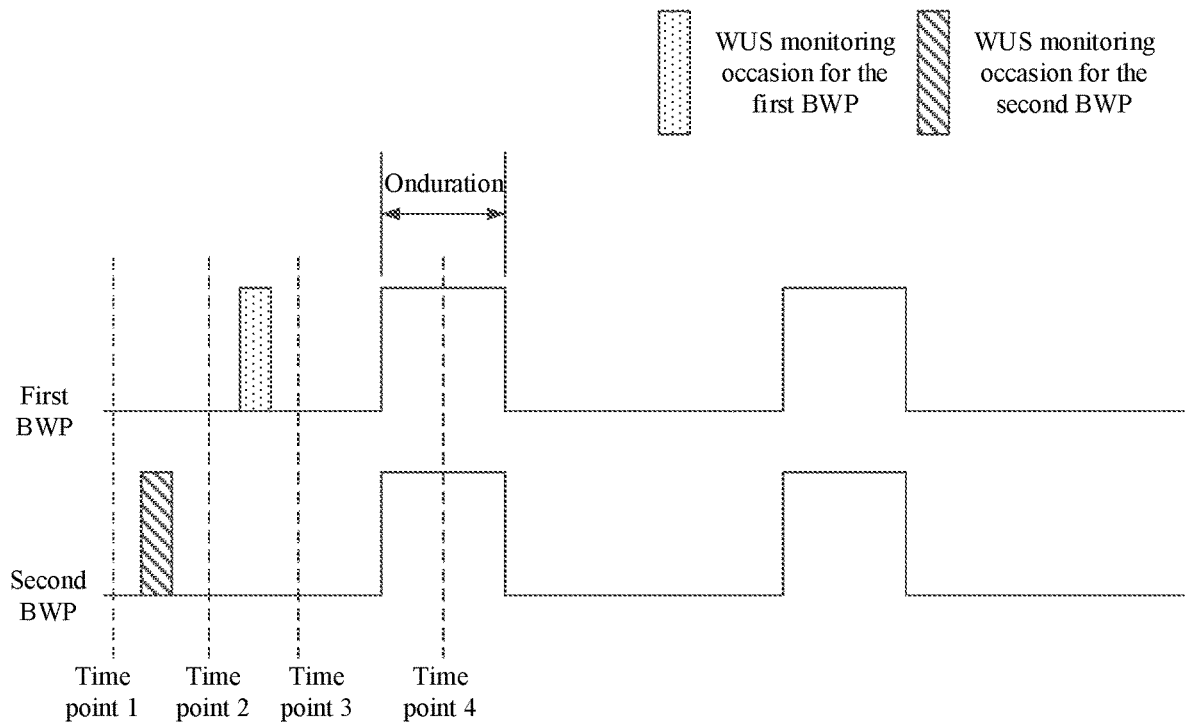
FIG. 5 is a third example diagram of a position of a BWP switching time point for a PDCCH monitoring control method according to an embodiment of this disclosure.
Figure 6:
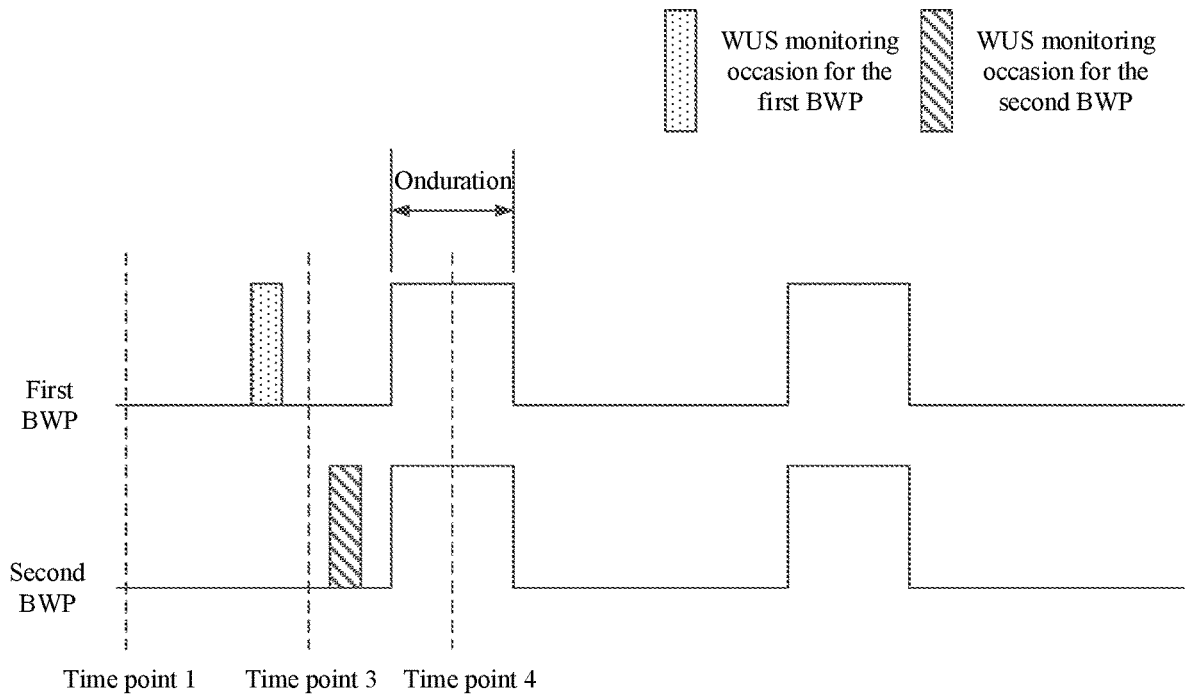
FIG. 6 is a fourth example diagram of a position of a BWP switching time point for a PDCCH monitoring control method according to an embodiment of this disclosure.

As shown in FIG. 5 and FIG. 6, a time point 1, a time point 2, a time point 3, and a time point 4 represent four BWP switching time points. As shown in FIG. 5, the time point 1 indicates a case that monitoring on the PDCCH-WUS of the first BWP is missed and monitoring on the PDCCH-WUS of the second BWP is not missed, and that the PDCCH-WUS signal is received or not received. The time point 2 indicates a case that monitoring on the PDCCH-WUS of the first BWP is missed and monitoring on the PDCCH-WUS of the second BWP is also missed. The time point 3 indicates a case that monitoring on the PDCCH-WUS of the first BWP is not missed and the PDCCH-WUS signal is received or not received; and that monitoring on the PDCCH-WUS of the second BWP is missed. The time point 4 indicates a case that the switching time point is within the DRX-onduration. As shown in FIG. 6, the time point 1 indicates a case that monitoring on the PDCCH-WUS of the first BWP is missed and monitoring on the PDCCH-WUS of the second BWP is not missed, and that the PDCCH-WUS signal is received or not received. The time point 3 indicates a case that monitoring on the PDCCH-WUS of the first BWP is not missed and the PDCCH-WUS signal is received or not received, and that monitoring on the PDCCH-WUS of the second BWP is not missed and the PDCCH-WUS signal is received or not received. The time point 4 indicates a case that the switching time point is within the DRX-onduration.

For the foregoing cases, the following sub-schemes are included in the scheme 3.

Scheme 3A: Compliance with an indication of the PDCCH-WUS of the first BWP.

In the case of the time point 4, the switching time point is within the DRX-onduration, the terminal always follows the indication of the WUS of the first BWP.

In all cases of other time points, if monitoring at the WUS occasion of the first BWP is missed, the terminal may start the next DRX-onduration timer, or may not start the next DRX-onduration timer. If monitoring at the WUS occasion of the first BWP is not missed, the terminal determines, based on whether the WUS information is received, whether to start the DRX-onduration timer.

Scheme 3B: Compliance with an indication of the PDCCH-WUS of the second BWP.

In the case of the time point 4, the terminal follows an indication of the WUS of the first BWP in a period of time between the starting time point of the onduration and the switching time point; and the terminal follows an indication of the PDCCH-WUS of the second BWP in a period of time between the switching time point and an ending time point of the onduration. However, monitoring on the PDCCH-WUS of the second BWP is missed, and therefore the terminal may perform PDCCH monitoring, or may not perform PDCCH monitoring.

In all cases of other time points, if monitoring at the WUS occasion of the second BWP is missed, the terminal may start the next DRX-onduration timer, or may not start the next DRX-onduration timer. If monitoring at the WUS occasion of the second BWP is not missed, the terminal determines, based on whether the WUS information is received, whether to start the DRX-onduration timer.

Scheme 3C: The DRX-onduration timer is always started.

In the case of the time point 4, the terminal follows an indication of the WUS of the first BWP in a period of time between the starting time point of the onduration and the switching time point; and the terminal is always woken up to monitor the PDCCH channel in a period of time between the switching time point and an ending time point of the onduration.

In all cases of other time points, the terminal always starts the DRX-onduration timer, that is, the terminal is always woken up to monitor the PDCCH channel. This is unrelated to WUS configuration statuses of the first BWP and the second BWP.

Scheme 3D: The DRX-onduration timer is never started.

In the case of the time point 4, the terminal follows an indication of the WUS of the first BWP in a period of time between the starting time point of the onduration and the switching time point; and the terminal remains dormant not to monitor the PDCCH channel in a period of time between the switching time point and an ending time point of the onduration.

In all cases of other time points, the terminal never starts the DRX-onduration timer, that is, the terminal UE remains dormant not to monitor the PDCCH channel. This is unrelated to WUS configuration statuses of the first BWP and the second BWP.

Scheme 3E: To be decided by the network device.

In the case of the time point 4, the terminal follows an indication of the WUS of the first BWP in a period of time between the starting time point of the onduration and the switching time point. In a period of time between the switching time point and an ending time point of the onduration, the terminal reports its preference to the network device after considering importance of power saving performance and QoS quality of the terminal, and the network device sends RRC signaling to inform the terminal whether to monitor the PDCCH channel.

In all cases of other time points, the terminal reports its preference to the network device after considering importance of power saving performance and QoS quality of the terminal, and the network device sends RRC signaling to inform the terminal whether to start the onduration timer.

Scheme 3F: according to the latest WUS.

In the case of the time point 3 shown in FIG. 6, monitoring on both the WUS of the first BWP and the WUS of the second BWP is not missed, and the terminal follows the indication of the latest received WUS to control the onduration timer to be on or off.

Scheme 4: In a case that the terminal switches from the first BWP without PDCCH-WUS configured to the second BWP without PDCCH-WUS configured, it can be construed as absence of the PDCCH-WUS concept, and for details, reference may be made to a pure DRX scheme in a case of no WUS.

FIG. 7 is a flowchart of a PDCCH monitoring control method according to an embodiment of this disclosure. The method is applied to a network device, and as shown in FIG. 7, includes the following step.

Step 701: Send a monitoring indication to a terminal, where the monitoring indication is used for determining, in a case that the terminal performs BWP switching, whether to perform PDCCH monitoring during a target discontinuous reception onduration DRX-onduration.

When a BWP switching time point for the terminal is outside an onduration, the target DRX-onduration is an onduration next to the BWP switching time point; and when the BWP switching time point for the terminal is within the onduration, the target DRX-onduration is an onduration within which the BWP switching time point falls.

Optionally, before the sending a monitoring indication to a terminal, the method further includes:
  receiving monitoring suggestion information reported by the terminal; and
  determining indication information of the monitoring indication based on the monitoring suggestion information.

It should be noted that this embodiment is used as an implementation of the network device corresponding to the embodiment shown in FIG. 2. For a specific implementation of this embodiment, reference may be made to the related descriptions of the embodiment shown in FIG. 2, and a same beneficial effect is achieved. To avoid repetition, details are not described herein again.

FIG. 8 is a structural diagram of a terminal according to an embodiment of this disclosure. As shown in FIG. 8, the terminal 800 includes:
  a first determining module 801, configured to: in a case that an active bandwidth part BWP of the terminal has changed from a first BWP to a second BWP, determine whether to perform PDCCH monitoring during a target discontinuous reception onduration DRX-onduration; where
  when a BWP switching time point for the terminal is outside an onduration, the target DRX-onduration is an onduration next to the BWP switching time point; and when the BWP switching time point for the terminal is within the onduration, the target DRX-onduration is an onduration within which the BWP switching time point falls.

Optionally, in a case that a first wake-up signal is configured for the first BWP, the first determining module 801 is specifically configured to perform at least one of the following:
- if the BWP switching time point is before a reception occasion of the first wake-up signal, determining, based on a protocol-prescribed monitoring status, whether to perform PDCCH monitoring during the target DRX-onduration; or
- if the BWP switching time point is after the reception occasion of the first wake-up signal, determining, based on a reception status of the first wake-up signal, whether to perform PDCCH monitoring during the target DRX-onduration.

Optionally, in a case that a first wake-up signal is configured for the first BWP and a second wake-up signal is not configured for the second BWP, the first determining module 801 is specifically configured to perform at least one of the following:
- if the BWP switching time point is outside the target DRX-onduration, determining, based on a protocol-prescribed monitoring status, whether to perform PDCCH monitoring during the target DRX-onduration; or
- if the BWP switching time point is within the target DRX-onduration, determining, based on a reception status of the first wake-up signal, whether to perform PDCCH monitoring in a first portion of time, and determining, based on a protocol-prescribed monitoring status, whether to perform PDCCH monitoring in a second portion of time; where
- the first portion of time is a period of time prior to the BWP switching time point in the target DRX-onduration, and the second portion of time is a period of time after the BWP switching time point in the target DRX-onduration.

Optionally, in a case that a first wake-up signal is not configured for the first BWP and a second wake-up signal is configured for the second BWP, the first determining module 801 is specifically configured to perform the following:
- determining, based on a protocol-prescribed monitoring status, whether to perform PDCCH monitoring during the target DRX-onduration.

Optionally, in a case that a first wake-up signal is not configured for the first BWP and a second wake-up signal is configured for the second BWP, the first determining module 801 is specifically configured to perform at least one of the following:
- if the BWP switching time point is before a reception occasion of the second wake-up signal, determining, based on a reception status of the second wake-up signal, whether to perform PDCCH monitoring during the target DRX-onduration; or
- if the BWP switching time is after the reception occasion of the second wake-up signal, determining, based on a protocol-prescribed monitoring status, whether to perform PDCCH monitoring during the target DRX-onduration.

Optionally, in a case that a first wake-up signal is configured for the first BWP and a second wake-up signal is configured for the second BWP, the first determining module 801 is specifically configured to perform at least one of the following:
- if the BWP switching time point is before a reception occasion of the second wake-up signal, determining, based on a reception status of the second wake-up signal, whether to perform PDCCH monitoring during the target DRX-onduration;
- if the BWP switching time point is between the reception occasion of the second wake-up signal and a starting time point of the target DRX-onduration, determining, based on a protocol-prescribed monitoring status, whether to perform PDCCH monitoring during the target DRX-onduration; or
- if the BWP switching time point is within the target DRX-onduration, determining, based on a reception status of the first wake-up signal, whether to perform PDCCH monitoring in a first portion of time, and determining, based on a protocol-prescribed monitoring status, whether to perform PDCCH monitoring in a second portion of time; where
- the first portion of time is a period of time prior to the BWP switching time point in the target DRX-onduration, and the second portion of time is a period of time after the BWP switching time point in the target DRX-onduration.

Optionally, in a case that a first wake-up signal is configured for the first BWP and a second wake-up signal is configured for the second BWP, the first determining module 801 is specifically configured to perform at least one of the following:
- if the BWP switching time point is after a reception occasion of the first wake-up signal and a reception occasion of the second wake-up signal, and before a starting time point of the target DRX-onduration, determining, based on a reception status of a target wake-up signal, whether to perform PDCCH monitoring during the target DRX-onduration; where
- the target wake-up signal is a wake-up signal whose reception occasion is closer to the target DRX-onduration in the first wake-up signal and the second wake-up signal.

Optionally, in a case that the BWP switching time point is within the target DRX-onduration, the first determining module 801 is specifically configured to perform at least one of the following:
- in a case that a first wake-up signal is configured for the first BWP, determining, based on a reception status of the first wake-up signal, whether to perform PDCCH monitoring in a first portion of time, and determining, according to a target monitoring indication sent by a network device, whether to perform PDCCH monitoring in a second portion of time; or
- in a case that the first wake-up signal is not configured for the first BWP, determining, based on a protocol-prescribed monitoring status, whether to perform PDCCH monitoring in the first portion of time, and determining, according to a monitoring indication sent by the network device, whether to perform PDCCH monitoring in the second portion of time; where
- the first portion of time is a period of time prior to the BWP switching time point in the target DRX-onduration, and the second portion of time is a period of time after the BWP switching time point in the target DRX-onduration.

Optionally, in a case that the BWP switching time point is outside the target DRX-onduration, the first determining module 801 is specifically configured to perform as the following:
- determining, according to a monitoring indication sent by a network device, whether to perform PDCCH monitoring during the target DRX-onduration.

Optionally, the monitoring indication is an indication sent by the network device based on monitoring suggestion information that is reported by the terminal.

Optionally, in a case that the BWP switching time point is within the target DRX-onduration, the first determining module 801 is specifically configured to perform at least one of the following:

in a case that a first wake-up signal is configured for the first BWP, determining, based on a reception status of the first wake-up signal, whether to perform PDCCH monitoring in a first portion of time, and determining, based on a protocol-prescribed monitoring status, whether to perform PDCCH monitoring in a second portion of time; or in a case that the first wake-up signal is not configured for the first BWP, determining, based on a protocol-prescribed monitoring status, whether to perform PDCCH monitoring during the target DRX-onduration; where the first portion of time is a period of time prior to the BWP switching time point in the target DRX-onduration, and the second portion of time is a period of time after the BWP switching time point in the target DRX-onduration.

Optionally, in a case that the BWP switching time point is outside the target DRX-onduration, the first determining module 801 is specifically configured to perform at least one of the following:

determining, based on a protocol-prescribed monitoring status, whether to perform PDCCH monitoring during the target DRX-onduration.

The terminal provided in this embodiment of this disclosure is capable of implementing the processes implemented by the terminal in the method embodiment in FIG. 2. To avoid repetition, details are not described herein again.

FIG. 9 is a structural diagram of a network device according to an embodiment of this disclosure. As shown in FIG. 9, the network device 900 includes:

a sending module 901, configured to send a monitoring indication to a terminal, where the monitoring indication is used for determining, in a case that the terminal performs BWP switching, whether to perform PDCCH monitoring during a target discontinuous reception onduration DRX-onduration; where when a BWP switching time point for the terminal is outside an onduration, the target DRX-onduration is an onduration next to the BWP switching time point; and when the BWP switching time point for the terminal is within the onduration, the target DRX-onduration is an onduration within which the BWP switching time point falls.

Optionally, the network device 900 further includes:

a receiving module, configured to receive monitoring suggestion information reported by the terminal; and a second determining module, configured to determine indication information of the monitoring indication based on the monitoring suggestion information.

The network device provided in this embodiment of this disclosure can implement the processes implemented by the network device in the method embodiment in FIG. 7. To avoid repetition, details are not described herein again.

Figure 10:
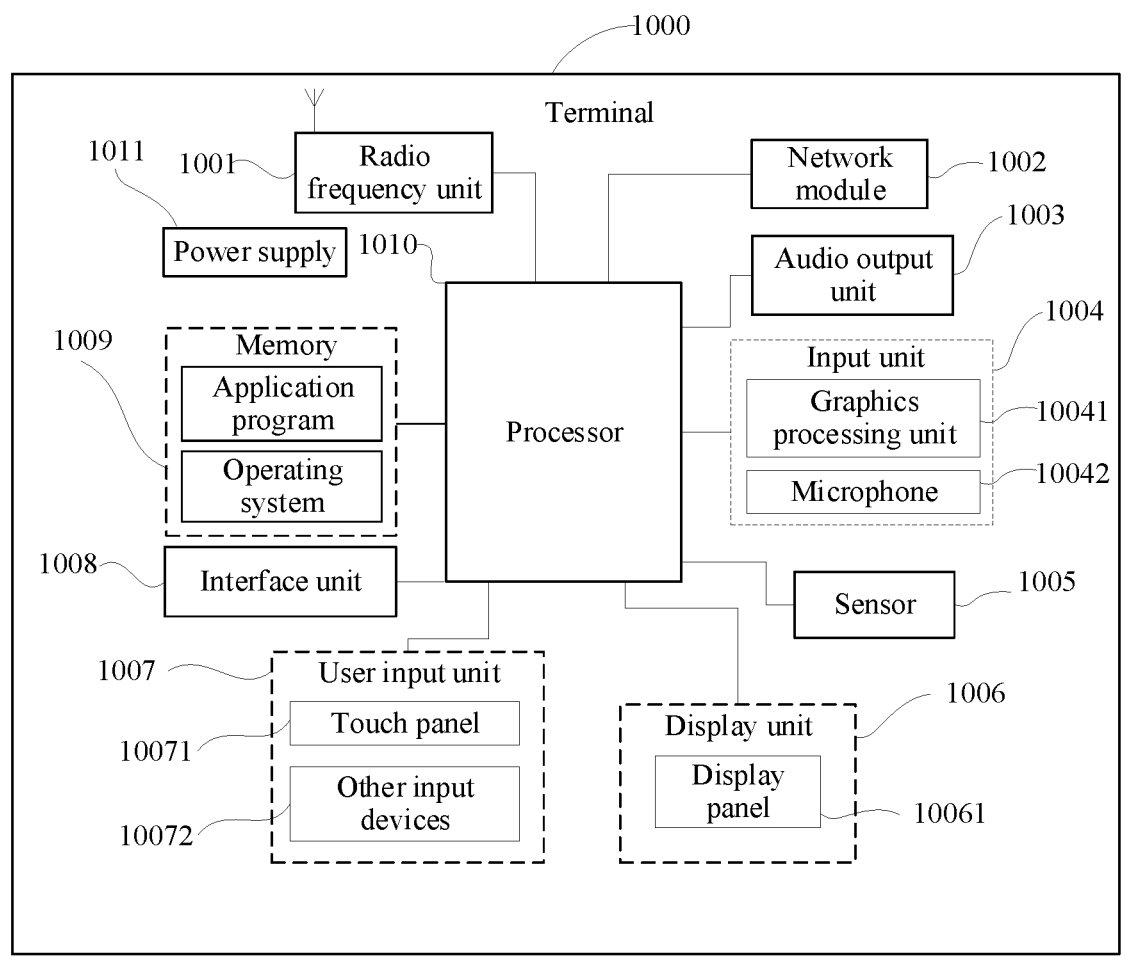
FIG. 10 is a structural diagram of another terminal according to an embodiment of this disclosure.

FIG. 10 is a schematic diagram of a hardware structure of a terminal for implementing the embodiments of this disclosure.

The terminal 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, a processor 1010, and a power supply 1011. A person skilled in the art may understand that the structure of the terminal shown in FIG. 10 does not constitute any limitation on the terminal device. The terminal may include more or fewer components than those shown in the figure, or a combination of some components, or the components disposed differently. In this embodiment of this disclosure, the terminal includes but is not limited to a mobile phone, a tablet computer, a laptop computer, a personal digital assistant, an in-vehicle terminal, a wearable device, a pedometer, and the like.

The processor 1010 is configured to: in a case that an active bandwidth part BWP of the terminal has changed from a first BWP to a second BWP, determine whether to perform PDCCH monitoring during a target discontinuous reception onduration DRX-onduration; where when a BWP switching time point for the terminal is outside an onduration, the target DRX-onduration is an onduration next to the BWP switching time point; and when the BWP switching time point for the terminal is within the onduration, the target DRX-onduration is an onduration within which the BWP switching time point falls.

It should be understood that in this embodiment, the processor 1010 and the radio frequency unit 1001 are capable of implementing the processes implemented by the terminal in the method embodiment in FIG. 2. To avoid repetition, details are not described herein again.

It should be understood that, in this embodiment of this disclosure, the radio frequency unit 1001 may be configured to: receive and transmit signals in an information receiving/transmitting process or a call process; and specifically, after receiving downlink data from a base station, transmit the downlink information to the processor 1010 for processing, and in addition, transmit uplink data to the base station. Generally, the radio frequency unit 1001 includes but is not limited to an antenna, at least one amplifier, a transceiver, a coupler, a low noise amplifier, a duplexer, and the like. In addition, the radio frequency unit 1001 may also communicate with a network and other devices via a wireless communications system.

The terminal provides a user with wireless broadband internet access through the network module 1002, for example, helping the user to transmit and receive e-mails, browse web pages, and access streaming media.

The audio output unit 1003 may convert audio data received by the radio frequency unit 1001 or the network module 1002 or stored in the memory 1009 into an audio signal and output the audio signal as a sound. Furthermore, the audio output unit 1003 may also provide audio output (for example, a call signal received sound or a message received sound) related to a specific function performed by the terminal 1000. The audio output unit 1003 includes a speaker, a buzzer, a receiver, and the like.

The input unit 1004 is configured to receive an audio or video signal. The input unit 1004 may include a graphics processing unit (Graphics Processing Unit, GPU) 10041 and a microphone 10042. The graphics processing unit 10041 processes image data of a still picture or video obtained by an image capture apparatus (such as a camera) in a video capture mode or an image capture mode. A processed image frame may be displayed on the display unit 1006. The image frame processed by the graphics processing unit 10041 may be stored in the memory 1009 (or another storage medium) or be transmitted by the radio frequency unit 1001 or the network module 1002. The microphone 10042 is capable of receiving sounds and processing such sounds into audio data. The processed audio data may be converted in a telephone call mode into a format that can be transmitted by the radio frequency unit 1001 to a mobile communications base station, for outputting.

The terminal 1000 further includes at least one sensor 1005, for example, an optical sensor, a motion sensor, and other sensors. Specifically, the optical sensor may include an ambient light sensor and a proximity sensor. The ambient light sensor may adjust luminance of the display panel 10061 based on brightness of ambient light, and the proximity sensor may turn off the display panel 10061 and/or backlight when the terminal 1000 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal, functions related to vibration recognition (such as pedometer and tapping), and the like. The sensor 1005 may also include a fingerprint sensor, a pressure sensor, an iris sensor, a molecular sensor, a gyroscope, a barometer, a hygrometer, a thermometer, an infrared sensor, and the like. Details are not described herein.

The display unit 1006 is configured to display information input by the user or information provided to the user. The display unit 1006 may include a display panel 10061, and the display panel 10061 may be configured in a form of a liquid crystal display (LCD), an organic light-emitting diode (OLED), or the like.

The user input unit 1007 may be configured to: receive a digit or character information that is input, and generate signal input related to user settings and function control of the terminal. Specifically, the user input unit 1007 may include a touch panel 10071 and other input devices 10072. The touch panel 10071 is also referred to as a touchscreen and can collect a touch operation (such as an operation performed by the user on the touch panel 10071 or near the touch panel 10071 with a finger or by using any proper object or accessory such as a stylus) of the user on or near the touch panel 10071. The touch panel 10071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touch-point coordinates, and transmits the touchpoint coordinates to the processor 1010, and can receive a command transmitted by the processor 1010 and execute the command. In addition, the touch panel 10071 may be implemented in a plurality of forms, for example, as a resistive, capacitive, infrared, or surface acoustic wave touch panel. The user input unit 1007 may further include the other input devices 10072 in addition to the touch panel 10071. Specifically, the other input devices 10072 may include but are not limited to a physical keyboard, a function key (such as a volume control key or an on/off key), a trackball, a mouse, and a joystick. Details are not described herein.

Further, the touch panel 10071 may cover the display panel 10061. When detecting a touch operation on or near the touch panel 10071, the touch panel 10071 transmits the touch operation to the processor 1010 to determine a type of a touch event. Then, the processor 1010 provides a corresponding visual output on the display panel 10061 based on the type of the touch event. In FIG. 10, the touch panel 10071 and the display panel 10061 serve as two independent components to implement input and output functions of the terminal. In some embodiments, however, the touch panel 10071 may be integrated with the display panel 10061 to implement the input and output functions of the terminal. This is not specifically limited herein.

The interface unit 1008 is an interface between an external apparatus and the terminal 1000. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 1008 may be configured to: receive input (for example, data information and power) from the external apparatus, and transmit the received input to one or more elements in the terminal 1000, or may be configured to transmit data between the terminal 1000 and the external apparatus.

The memory 1009 may be configured to store software programs and various data. The memory 1009 may mainly include a program storage area and a data storage area. The program storage area may store an operating system, and an application program required by at least one function (for example, a sound playback function or an image playback function). The data storage area may store data (for example, audio data or a phone book) created according to use of the mobile phone. In addition, the memory 1009 may include a high-speed random access memory, and may further include a non-volatile memory such as at least one disk storage device, a flash memory device, or another volatile solid-state storage device.

The processor 1010 is a control center of the terminal, and is connected to all components of the terminal by using various interfaces and lines. By running or executing a software program and/or module that is stored in the memory 1009 and calling data stored in the memory 1009, the processor 1010 executes various functions of the terminal and processes data, so as to perform overall monitoring on the terminal. The processor 1010 may include one or more processing units. Optionally, an application processor and a modem processor may be integrated in the processor 1010. The application processor primarily processes an operating system, user interfaces, application programs, and the like. The modem processor primarily processes radio communication. It can be understood that the modem processor may alternatively be not integrated in the processor 1010.

The terminal 1000 may further include the power supply 1011 (for example, a battery) supplying power to all components. Optionally, the power supply 1011 may be logically connected to the processor 1010 through a power management system. In this way, functions such as charge management, discharge management, and power consumption management are implemented by using the power management system.

In addition, the terminal 1000 includes some functional modules that are not illustrated. Details are not described herein.

Optionally, an embodiment of this disclosure further provides a terminal, including a processor 1010, a memory 1009, and a computer program stored in the memory 1009 and capable of running on the processor 1010. When the computer program is executed by the processor 1010, the processes of the foregoing PDCCH monitoring control method embodiment can be implemented, with the same technical effects achieved. To avoid repetition, details are not described herein again.

Figure 11:
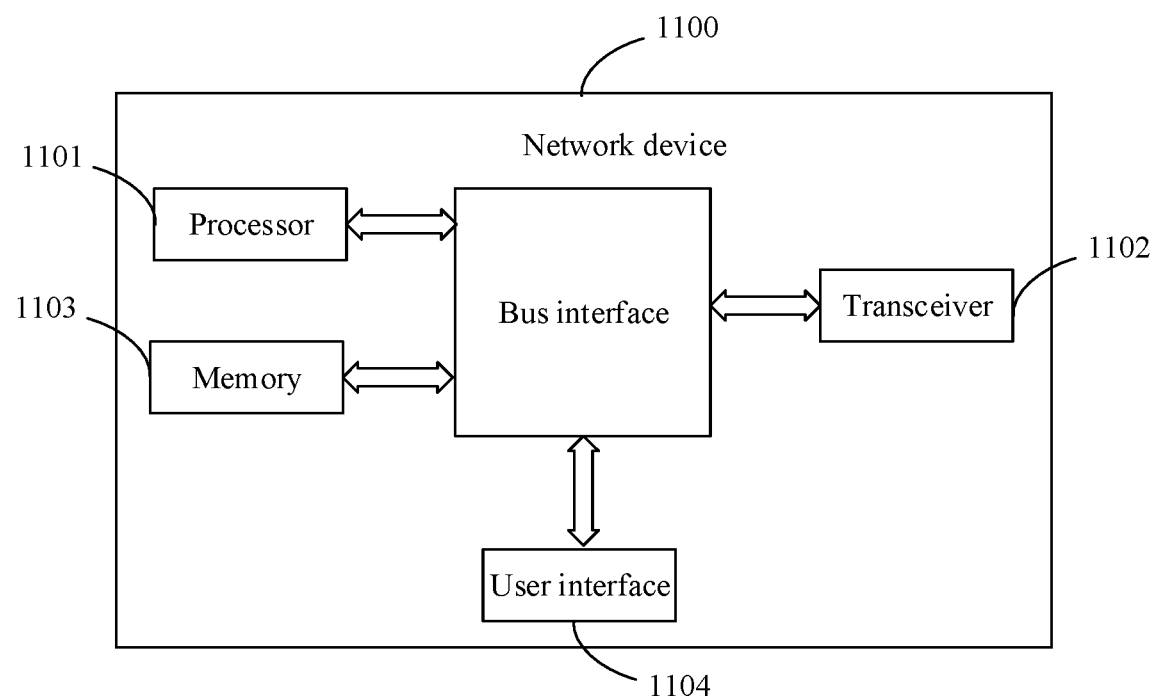
FIG. 11 is a structural diagram of another network device according to an embodiment of this disclosure.

FIG. 11 is a structural diagram of another network device according to an embodiment of this disclosure. As shown in FIG. 11, the network device 1100 includes a processor 1101, a transceiver 1102, a memory 1103, and a bus interface.

The transceiver 1102 is configured to send a monitoring indication to a terminal, where the monitoring indication is used for determining, in a case that the terminal performs BWP switching, whether to perform PDCCH monitoring during a target discontinuous reception onduration DRX-onduration; where when a BWP switching time point for the terminal is outside an onduration, the target DRX-onduration is an onduration next to the BWP switching time point; and when the BWP switching time point for the terminal is within the onduration, the target DRX-onduration is an onduration within which the BWP switching time point falls.

It should be understood that in this embodiment, the processor 1101 and the transceiver 1102 are capable of implementing the processes implemented by the network device in the method embodiment in FIG. 7. To avoid repetition, details are not described herein again.

In FIG. 11, a bus architecture may include any quantity of interconnected buses and bridges, specifically for interconnecting various circuits of one or more processors represented by the processor 1101 and a memory represented by the memory 1103. The bus architecture may further interconnect various other circuits such as a peripheral device, a voltage regulator, and a power management circuit. These are all well known in the art, and therefore are not further described in this specification. The bus interface provides an interface. The transceiver 1102 may be a plurality of components, that is, the transceiver 1102 includes a transmitter and a receiver, and provides a unit for communicating with various other apparatuses on a transmission medium. For different user equipments, the user interface 1104 may also be an interface for externally or internally connecting a required device, and the connected device includes but is not limited to a mini keyboard, a display, a speaker, a microphone, a joystick, or the like.

The processor 1101 is responsible for management of the bus architecture and general processing, and the memory 1103 is capable of storing data that is used by the processor 1101 during operation.

Optionally, an embodiment of this disclosure further provides a network device, including a processor 1101, a memory 1103, and a computer program stored in the memory 1103 and capable of running on the processor 1101. When the computer program is executed by the processor 1101, the processes of the foregoing PDCCH monitoring control method embodiment can be implemented, with the same technical effects achieved. To avoid repetition, details are not described herein again.

An embodiment of this disclosure further provides a computer-readable storage medium. The computer-readable storage medium stores a computer program, and when the computer program is executed by a processor, the processes of the PDCCH monitoring control method embodiment on the network device side according to some embodiments of this disclosure can be implemented, or when the computer program is executed by a processor, the processes of the PDCCH monitoring control method embodiment on the terminal side according to some embodiments of this disclosure is implemented, with the same technical effects achieved. To avoid repetition, details are not described herein again. The computer-readable storage medium is, for example, a read-only memory (ROM), a random access memory (RAM), a magnetic disk, or an optical disc.

It should be noted that the terms "include," "comprise," or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially, or the part contributing to the related art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a base station, or the like) to perform the method described in the embodiments of this disclosure.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A physical downlink control channel (PDCCH) monitoring control method, performed by a terminal and comprising:

in a case that an active bandwidth part (BWP) of the terminal has changed from a first BWP to a second BWP, determining whether to perform PDCCH monitoring during a target discontinuous reception onduration (DRX-onduration); wherein when a BWP switching time point for the terminal is outside an onduration, the target DRX-onduration is an onduration next to the BWP switching time point; and in a case that a first wake-up signal is not configured for the first BWP and a second wake-up signal is configured for the second BWP, the determining whether to perform PDCCH monitoring during a target DRX-onduration comprises at least one of the following:

in a case that the BWP switching time point is before a reception occasion of the second wake-up signal, determining, based on a reception status of the second wake-up signal, whether to perform PDCCH monitoring during the target DRX-onduration, or in a case that the BWP switching time is after the reception occasion of the second wake-up signal, determining, based on a protocol-prescribed monitoring status, whether to perform PDCCH monitoring during the target DRX-onduration.

2. The method according to claim 1, wherein in a case that a first wake-up signal is configured for the first BWP, the determining whether to perform PDCCH monitoring during a target DRX-onduration comprises at least one of the following:
   in a case that the BWP switching time point is before a reception occasion of the first wake-up signal, determining, based on a protocol-prescribed monitoring status, whether to perform PDCCH monitoring during the target DRX-onduration; or
   in a case that the BWP switching time point is after the reception occasion of the first wake-up signal, determining, based on a reception status of the first wake-up signal, whether to perform PDCCH monitoring during the target DRX-onduration.

3. The method according to claim 1, wherein in a case that a first wake-up signal is configured for the first BWP and a second wake-up signal is not configured for the second BWP, the determining whether to perform PDCCH monitoring during a target DRX-onduration comprises at least one of the following:
   in a case that the BWP switching time point is outside the target DRX-onduration, determining, based on a protocol-prescribed monitoring status, whether to perform PDCCH monitoring during the target DRX-onduration; or
   in a case that the BWP switching time point is within the target DRX-onduration, determining, based on a reception status of the first wake-up signal, whether to perform PDCCH monitoring in a first portion of time, and determining, based on a protocol-prescribed monitoring status, whether to perform PDCCH monitoring in a second portion of time; wherein
   the first portion of time is a period of time prior to the BWP switching time point in the target DRX-onduration, and the second portion of time is a period of time after the BWP switching time point in the target DRX-onduration.

4. The method according to claim 1, wherein in a case that a first wake-up signal is not configured for the first BWP and a second wake-up signal is configured for the second BWP, the determining whether to perform PDCCH monitoring during a target DRX-onduration comprises:
   determining, based on a protocol-prescribed monitoring status, whether to perform PDCCH monitoring during the target DRX-onduration.

5. The method according to claim 1, wherein in a case that a first wake-up signal is configured for the first BWP and a second wake-up signal is configured for the second BWP, the determining whether to perform PDCCH monitoring during a target DRX-onduration comprises at least one of the following:
   in a case that the BWP switching time point is before a reception occasion of the second wake-up signal, determining, based on a reception status of the second wake-up signal, whether to perform PDCCH monitoring during the target DRX-onduration;
   in a case that the BWP switching time point is between the reception occasion of the second wake-up signal and a starting time point of the target DRX-onduration, determining, based on a protocol-prescribed monitoring status, whether to perform PDCCH monitoring during the target DRX-onduration.

6. The method according to claim 1, wherein in a case that a first wake-up signal is configured for the first BWP and a second wake-up signal is configured for the second BWP, the determining whether to perform PDCCH monitoring during a target DRX-onduration comprises:
   in a case that the BWP switching time point is after a reception occasion of the first wake-up signal and a reception occasion of the second wake-up signal, and before a starting time point of the target DRX-onduration, determining, based on a reception status of a target wake-up signal, whether to perform PDCCH monitoring during the target DRX-onduration; wherein
   the target wake-up signal is a wake-up signal whose reception occasion is closer to the target DRX-onduration in the first wake-up signal and the second wake-up signal.

7. The method according to claim 1, wherein in a case that the BWP switching time point is within the target DRX-onduration, the determining whether to perform PDCCH monitoring during a target DRX-onduration comprises at least one of the following:
   in a case that a first wake-up signal is configured for the first BWP, determining, based on a reception status of the first wake-up signal, whether to perform PDCCH monitoring in a first portion of time, and determining, according to a target monitoring indication sent by a network device, whether to perform PDCCH monitoring in a second portion of time; or
   in a case that the first wake-up signal is not configured for the first BWP, determining, based on a protocol-prescribed monitoring status, whether to perform PDCCH monitoring in the first portion of time, and determining, according to a monitoring indication sent by the network device, whether to perform PDCCH monitoring in the second portion of time; wherein
   the first portion of time is a period of time prior to the BWP switching time point in the target DRX-onduration, and the second portion of time is a period of time after the BWP switching time point in the target DRX-onduration.

8. The method according to claim 7, wherein the monitoring indication is an indication sent by the network device based on monitoring suggestion information that is reported by the terminal.

9. The method according to claim 1, wherein in a case that the BWP switching time point is outside the target DRX-onduration, the determining whether to perform PDCCH monitoring during a target DRX-onduration comprises:
   determining, according to a monitoring indication sent by a network device, whether to perform PDCCH monitoring during the target DRX-onduration.

10. The method according to claim 1, wherein in a case that the BWP switching time point is within the target DRX-onduration, the determining whether to perform PDCCH monitoring during a target DRX-onduration comprises at least one of the following:
   in a case that a first wake-up signal is configured for the first BWP, determining, based on a reception status of the first wake-up signal, whether to perform PDCCH monitoring in a first portion of time, and determining, based on a protocol-prescribed monitoring status, whether to perform PDCCH monitoring in a second portion of time; or
   in a case that the first wake-up signal is not configured for the first BWP, determining, based on a protocol-prescribed monitoring status, whether to perform PDCCH monitoring during the target DRX-onduration; wherein
   the first portion of time is a period of time prior to the BWP switching time point in the target DRX-onduration, and the second portion of time is a period of time after the BWP switching time point in the target DRX-onduration.

11. The method according to claim 1, wherein in a case that the BWP switching time point is outside the target DRX-onduration, the determining whether to perform PDCCH monitoring during a target DRX-onduration comprises:
   determining, based on a protocol-prescribed monitoring status, whether to perform PDCCH monitoring during the target DRX-onduration.

12. A terminal, comprising a memory, a processor, and a program stored in the memory and capable of running on the processor, wherein when the program is executed by the processor, the terminal performs the following steps:
   in a case that an active bandwidth part (BWP) of the terminal has changed from a first BWP to a second BWP, determining whether to perform PDCCH monitoring during a target discontinuous reception onduration (DRX-onduration); wherein when a BWP switching time point for the terminal is outside an onduration, the target DRX-onduration is an onduration next to the BWP switching time point; and
   in a case that a first wake-up signal is not configured for the first BWP and a second wake-up signal is configured for the second BWP the determining whether to perform PDCCH monitoring during a target DRX-onduration comprises at least one of the following:
      in a case that the BWP switching time point is before a reception occasion of the second wake-up signal determining, based on a reception status of the second wake-up signal, whether to perform PDCCH monitoring during the target DRX-onduration; or
      in a case that the BWP switching time is after the reception occasion of the second wake-up signal, determining, based on a protocol-prescribed monitoring status, whether to perform PDCCH monitoring during the target DRX-onduration.

13. The terminal of claim 12, wherein in a case that a first wake-up signal is configured for the first BWP, the determining whether to perform PDCCH monitoring during a target DRX-onduration comprises at least one of the following:
   in a case that the BWP switching time point is before a reception occasion of the first wake-up signal, determining, based on a protocol-prescribed monitoring status, whether to perform PDCCH monitoring during the target DRX-onduration; or
   in a case that the BWP switching time point is after the reception occasion of the first wake-up signal, determining, based on a reception status of the first wake-up signal, whether to perform PDCCH monitoring during the target DRX-onduration.

14. The terminal of claim 12, wherein in a case that a first wake-up signal is configured for the first BWP and a second wake-up signal is configured for the second BWP, the determining whether to perform PDCCH monitoring during a target DRX-onduration comprises at least one of the following:
   in a case that the BWP switching time point is before a reception occasion of the second wake-up signal, determining, based on a reception status of the second wake-up signal, whether to perform PDCCH monitoring during the target DRX-onduration; or
   in a case that the BWP switching time point is between the reception occasion of the second wake-up signal and a starting time point of the target DRX-onduration, determining, based on a protocol-prescribed monitoring status, whether to perform PDCCH monitoring during the target DRX-onduration.

15. The terminal of claim 12, wherein in a case that the BWP switching time point is outside the target DRX-onduration, the determining whether to perform PDCCH monitoring during a target DRX-onduration comprises:
   determining, based on a protocol-prescribed monitoring status, whether to perform PDCCH monitoring during the target DRX-onduration.

* * * * *